June 21, 1966  C. B. HEARD, JR  3,256,562
EXTRUDING SYSTEM
Filed Aug. 10, 1964
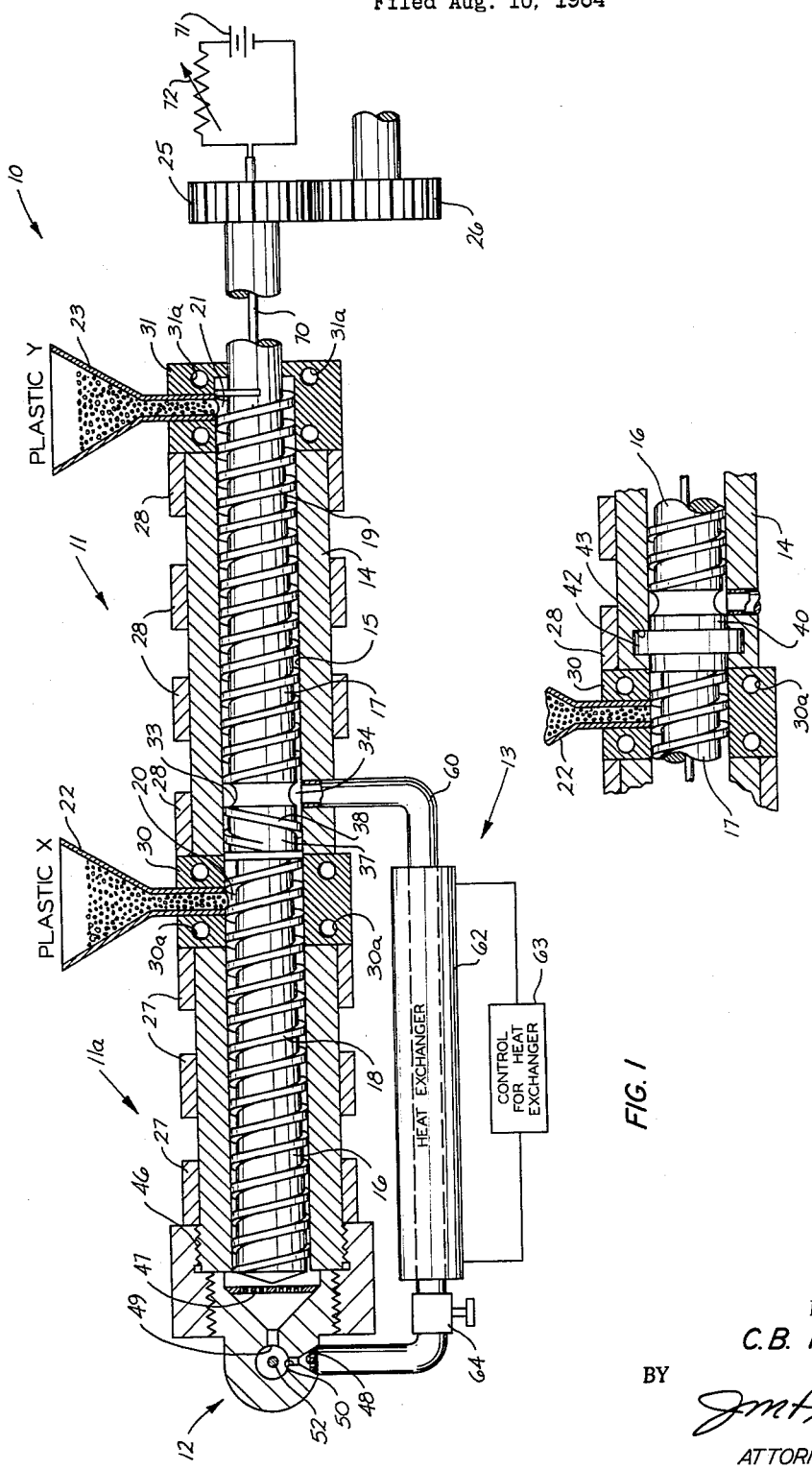
INVENTOR.
C.B. HEARD JR.
BY
*JM Presson*
ATTORNEY United States Patent Office 3,256,562
Patented June 21, 1966

3,256,562
EXTRUDING SYSTEM
Charles B. Heard, Jr., Severna Park, Md., assignor to Western Electric Company, Incorporated, New York, N.Y., a corporation of New York
Filed Aug. 10, 1964, Ser. No. 388,477
8 Claims. (Cl. 18—12)

This invention relates generally to an extruding system and more specifically to apparatus for supplying two or more plasticized materials to a single extruder head, the plasticized materials requiring the same or different relative temperatures to be rendered plastic.

In the electrical art, it is typically requisite to provide an electrical conductor having a plurality of concentric coatings thereon formed of different types of plastic materials requiring respectively different temperatures to plasticize, or it may be requisite to provide continuous or intermittent plastic coatings having certain desirable features, such as color, or certain desirable properties, to each of a plurality of electrical conductors in juxtaposed or twisted relationship.

In accordance with conventional plastic extrusion practice, the coatings of plastic material are applied to a conductor or pairs of conductors during advancement thereof through a single extruder head incorporating suitable screen filters, breaker plates and dies. When two or more plastic materials requiring different relative temperatures to plasticize are to be applied to a conductor or to conductor pairs, a problem of significance commonly arises from the necessity for heating the metering or plasticizing section of the extruder as well as the extruder head to a temperature at least approximating that of the plasticizing temperature of the material requiring the highest temperature to plasticize. If the plasticizing section of the extruder or the extruder head is heated to a temperature substantially that of the higher-temperature material, and the temperature required to plasticize the other material is substantially lower, deleterious decomposition of the lower-temperature material may occur particularly at the lower-temperature input opening for supplying plastic to the plasticizing section as well as at the extruder head. Decomposition of material at the inlet opening supplying the lower-temperature material to the feeding section of the extruder may clog this opening and consequently interfere with proper feeding of material to the compressing and plasticizing sections of the extruder, whereas at the extruder head the decomposed material may clog the filter screen and the dies. Decomposition of the lower-temperature material is particularly noticeable when the extruder is heated initially for the extrusion operation.

It would thus be advantageous to have the extruding system possess the capability of supplying two materials in plasticized form at relatively different temperatures to the extruder head without attendant decomposition of the lower-temperature material.

It has been recently discovered that some types of plastics, as, for example, polyethylene, may be plasticized at the required plasticizing temperature thereof, and subsequently cooled to a lower temperature without appreciably affecting the extruding properties of the material. This property of certain plastics is utilized by the present invention as will be subsequently evident in order to overcome the aforediscussed problem of material decomposition.

As is recognized by those skilled in the extrusion art, commercially available extruders have a characteristic temperature profile which typically varies throughout the length of the extruder so that the temperature of the material flowing from the plasticizing section into the extruder head may vary considerably as a function of operating time. Variations in temperature of the plastic material particularly throughout the length of the extruder generally result from the inability of known extrusion systems to accurately control the temperature of the respective feed, compression and plasticizing sections of the extruder. The extruding apparatus of the instant invention is designed so that the temperature of at least one of the plastic materials supplied to the extruder head may be controlled sufficiently remote from the extruder casing so as to achieve more accurate temperature control of that material immediately prior to the extrusion thereof.

Accordingly, it is a principal object of this invention to provide a plastic extruding system for feeding and metering two or more plastic materials requiring different relative temperatures to a common extruder head.

Another object of this invention is to provide a plastic extruding system for feeding and metering two or more plastic materials requiring different relative temperatures to a common extruder head, the temperature of at least one plasticized material being accurately controlled prior to the extrusion thereof.

A further object of this invention is to provide a dual extruding system wherein decomposition of the materials by heat applied to render the materials plastic is effectively prevented.

According to this invention, a plastic extruding system is provided for applying two or more plastic materials having different relative plasticizing temperatures to an elongated article, such as an electrical conductor. The system permits accurate temperature regulation of at least one of the plastic materials supplied thereto and further effectively decreases the possibility of improper system operation resulting from the decomposition of one or more of the plastic materials during the feeding, compression, plasticizing or extrusion thereof.

Other objects and advantages will be apparent from the following detail description when considered in conjunction with the accompanying drawings, wherein:

FIG. 1 illustrates a partial sectional side view of the extrusion system constructed in accordance with the instant invention, and FIG. 2 is a sectional side view of a modification of the extrusion system illustrated in FIG. 1.

Referring now to FIG. 1 of the drawing for a more complete understanding of this invention, numeral 10 refers generally to a plastic extruding system comprising two sections 11 and 11a, respectively, an extruder head 12, and a heat exchange path 13 for conveying for one material remote from heat radiating from the plasticizing sections.

The sections 11 and 11a of the extruder 10 are partially formed by a stationary, cylindrical casing 14 having an inner cylindrical bore 15 and a pair of plastic working worms 16 and 17, respectively, positioned in tandem in the bore 15 in respective downstream and upstream locations with respect to the direction of advancement of the plasticized material through the casing 14. The worms 16 and 17 may be formed with tapered stems as shown in the drawing, each tapered stem preferably having a series of constant pitch helical flights 18 and 19, respectively, thereon. The flights 18 and 19 and the stems of the worms 16 and 17 are designed to coact with the surface of the bore 15 in a manner well known to those in the art so that the material is successively fed, compressed and plasticized as it advances along the length of each worm in the downstream direction, that is, from right to left as viewed in FIG. 1 of the drawings.

Openings 20 and 21 are formed in the casing 14 at spaced-apart intervals along the longitudinal axis of the casing 14 and are positioned opposite the upstream ends, or what may be regarded as the feed section of each of worms 16 and 17, respectively. The inlet openings 20 and 21 may individually receive granules of plastic material designated plastic X and plastic Y, respectively, from funnel-shaped hoppers 22 and 23, respectively, plastics X and Y requiring different relative temperatures in order to be rendered plastic for working by the worms 16 and 17.

Plastic X may, for example, be polyvinyl chloride that may be of one color and plastic Y may be polyethylene having a different color, each material requiring different temperatures to plasticize, that is, approximately 325° F. and 450° F., respectively. The polyethylene, as mentioned above, will remain in an extrudable condition after the temperature thereof is reduced below its original plasticizing temperature of 450° F. to a temperature which may be higher than the 325° F. temperature required to plasticize the polyvinyl chloride but not high enough to cause decomposition of the polyvinyl chloride. It should be understood, however, that these materials are merely exemplary of two plastics that are now commonly applied to elongated articles such as electrical conductors, and that other material having these characteristics may also be used without varying from the principles of the instant invention. Obviously, if color-coding applications are not contemplated, both materials may be of the same color.

Referring again to FIG. 1, the worms 16 and 17 are shown to be fixed to a common shaft that extends axially through the bore 15 of the casing 14, the worms being driven in unison at the upstream end of the casing 14 by meshing spur gears 25 and 26, respectively, the gears being driven by any conventional drive means (not shown). The casing 14 may be partially encased by heating elements 27 and 28 which may be individually controlled by means, not illustrated, to respectively heat the material feeding, compressing and plasticizing areas or channels formed by the stems of the worms 16 and 17, the flights 18 and 19, respectively, and the bore 15 to predetermined respective temperatures. The heating elements 27 and 28 may be of any conventional type, such as electrical resistance elements coupled to a suitable source of power, not shown, or coils through which steam or other high-temperature fluid may circulate. In addition, cylindrical cooling jackets 30 and 31 are embodied in the casing 14, the jackets 30 and 31 having passages 30a and 31a, respectively, that receive and circulate coolant therethrough from a source, not shown, the temperature of each jacket being preferably individually controlled by conventional mechanism, not shown. The jackets 30 and 31 serve to reduce the temperatures of the areas proximate the respective inlet openings 20 and 21 as well as the temperature of the hoppers 22 and 23, respectively, particularly during the beginning of an extruding operation when the heat applied to the sections 11 and 11a by the heaters 27 and 28 may vary considerably.

If the cooling jacket 30 is not provided for cooling the inlet opening 20 and the hopper 22, it is possible that the material requiring the lower temperature to plasticize might be decomposed or rendered tacky by heat received by conduction and radiation from the higher-temperature section of the casing 14 heated to the higher temperature by the heaters 28, and thus effects thermal isolation of the sections 11 and 11a one from the other. Tackiness of the material may cause bridging of the opening 20 and consequent blocking of material feeding.

Referring now to the section of casing 14 proximate the downstream end of the upstream-located worm 17, a peripheral groove 33 is formed on the stem of the worm 17, the groove 33 receiving the plasticized material forced from the downstream or plasticizing end of the worm 17, and directing the plasticized material so received into a material egress opening 34 formed in the casing 14. As will be discussed in greater detail subsequently, plasticized material forced through the opening 34 is conveyed through the external heat exchange path 13 to the extruder head 12.

In order to prevent intermixing of the two plastics X and Y prior to extrusion, an isolation section 37 is provided between the feed end of the worm 16 and the groove 33. The embodiment of the section 37 illustrated in FIG. 1 of the drawings comprises plural helical flights 38 having a pitch opposite the pitch of the flights 18 and 19 of the worms 16 and 17, respectively, the flights 19 extending closely adjacent the bore 15 to prevent the flow of material therebetween. Rotary movement imparted to the flights 38 by rotation of gears 25 and 26 would force plastic in an upstream direction and thus into the groove 34 thereby preventing flow of the plastic Y from the worm 17 to the worm 16, and vice versa.

As another possible alternative embodiment, the intermixing of material between worms may also be prevented by the embodiment illustrated in FIG. 2 of the drawing. In this latter embodiment, the shaft 40 connecting the worms 16 and 17 is provided with an outer diameter in close tolerance with the bore 15, the shaft 40 being further formed with an annular tongue 42 that mates with an annular groove 43 formed in the casing 14 for the purpose of blocking intermixing of plastics X and Y. The embodiments illustrated in FIGS. 1 and 2, respectively, for effecting this purpose are merely exemplary of two possible designs, as will be evident to those in the art.

The extruder head 12 is threadedly secured by means of mating threads 46 to the downstream end of the casing 14 and is positioned to receive directly plasticized plastic X from the worm 17 at a temperature which may be roughly regulated by the heaters 27. Precise regulation of the temperature of the plastic during, and immediately after working by the worm 16, is not generally attainable. More typically, the temperature of the material worked by the worm 16 can be expected to vary throughout the length of the worm, and thus the temperature of the worked material forced out by worm rotation can also be expected to vary.

The extruder head 12 is of conventional design incorporating screen filters and breaker plates, designated generally by numerals 47 and 48, and plastic-applying dies 49 and 50, respectively. The dies 49 and 50 may be constructed and arranged to apply concentric coatings of plastics X and Y, respectively, to an electrical conductor referred to generally by numeral 52, the conductor being advanced by mechanism, not shown, through the extruder head 12. The construction and arrangement of the extruding dies is ordinarily a matter of design by those skilled in the art, and the dies in the head may also be constructed and arranged to apply individual coatings to each of a pair of conductors in parallel or twisted relationship so that plastic X is applied to one conductor and plastic Y to the other conductor, with intermixing and adherence between the two coatings occurring along a line of mutual contact therebetween.

With reference to FIG. 1, and as mentioned hereinabove, the opening 34 in the casing 14 receives plasticized material from the worm 17 and supplies this material to the heat exchange system 13. The system 13 includes a material conveying tube 60 connecting the groove 33 to one or more dies in the extruder head 12 receiving plastic Y from the section 11. The system 13 is located sufficiently remote from the sections 11 and 11a to permit accurate temperature regulation to the plastic Y flowing through the tube 60. A heat exchanger, designated by numeral 62, is operatively coupled to the tube 60 and is under the control of a conventional control device 63 which may be selectively switched and regulated so that heat is either added to, or removed from, the material flowing through the tube 60 by heat exchange therewith. Whether heat is added to or removed from plastic Y obviously depends upon the temperature required to maintain the material plastic and the desired temperature of that plastic at the extruder head 12. As discussed previously, if heat must be removed from plastic Y to achieve substantially equal temperatures of both plastics X and Y at the extruder head, plastic Y must retain the capability of extruding at the lower temperature.

In order to regulate the quantity of plastic Y supplied to the extruder head 12, a regulating valve 64 is incorporated in the tube 60. If it is desired to employ the plasticizing worms disclosed in this invention in approximately modified conventional extruder casings, it may be necessary to increase the effective length-to-diameter ratio of the worms by the addition of a Calrod 70 that extends axially through the shaft of the worms. The Calrod 70 may be heated to the desired temperature by a battery 71 supplying current to the Calrod through a variable current limiting resistance 72.

It is to be understood that the above-described arrangement is merely illustrative of the application of the principles of the invention. Numerous other arrangements may be readily devised by those skilled in the art which will embody the principles of the invention and fall within the spirit and scope thereof.

What is claimed is:

1. An extruding apparatus for extruding plural materials onto elongated articles advancing through the apparatus, comprising:
   a chamber of susbtantially cylindrical shape, said chamber having upstream and downstream ends defined by the direction of material flow therethrough,
   an extruder head positioned to receive one material egressing from the downstream end of said chamber for applying the one material received thereby onto elongated articles advancing through said head,
   upstream and downstream material working elements having respective upstream and downstream ends, said elements being mounted in tandem relationship in said chamber,
   plural means communicating with said chamber adjacent the upstream ends of both of said elements for supplying an extrudable material to each element,
   means for supplying heat to each of said elements to render plastic the material received thereby,
   material conveying means communicating with said chamber proximate the downstream end of the upstream element and extending externally therefrom to connect with said extruder head so as to supply thereto the material issuing from said upstream element, and
   means for regulating the temperature of material flowing in said material conveying means so that a predetermined temperature is maintained in the material supplied to said extruder head from said material conveying means.

2. The apparatus as claimed in claim 1, wherein: means are located intermediate said elements for substantially inhibiting conduction of heat between said elements.

3. The apparatus as claimed in claim 1, wherein: means are provided in said chamber between said elements for blocking the intermixing of material in said chamber between said elements.

4. Apparatus for extruding at least two materials onto an article, one of the materials requiring a higher temperature to plasticize than the other, the apparatus comprising:
   a casing having a substantially cylindrical bore therein,
   at least two worms connected in tandem and mounted for axial rotation in the bore of said casing, said two worms being in upstream and downstream relationship with respect to the direction of material flow through said casing, each worm having respective upstream and downstream ends and forming respective material feeding and plasticizing sections with the bore of said casing between said ends, the downstream end of the upstream-located worm being connected to the upstream end of the downstream-located worm and said downstream ends issuing plasticized material supplied to said upstream ends,
   means heating the sections between each worm and the bore of said casing for rendering plastic the material supplied to each worm,
   means communicating with the feeding section of each worm for supplying material thereto, said upstream worm being supplied the material requiring a higher temperature to plasticize,
   receiving means positioned to receive the plasticized material issuing from said downstream-located worm for extruding the material onto an article,
   material conveying means extending from said casing and connecting the downstream end of said upstream-located worm at least directly to the receiving means for conveying the higher-temperature plasticized material from said upstream-located worm to said receiving means, and
   means located at least proximate said material conveying means for reducing the temperature of plasticized material flowing therein until a predetermined temperature differential exists between the material supplied to said receiving means by said material conveying means and the material supplied to said receiving means by said downstream-located worm.

5. The apparatus as claimed in claim 4, wherein: means are additionally provided proximate the material supplying means of the downstream-located worm for regulating the temperature of material issuing therefrom and for substantially inhibiting heat transfer between the respective worm sections.

6. The apparatus as claimed in claim 4, wherein: means are provided adjacent the connection between said downstream end of said upstream-located worm and said upstream end of said downstream-located worm for preventing the flow of material therebetween.

7. The apparatus as claimed in claim 4, wherein: valve means are additionally provided in said conveying means for metering the quantity of plasticized material conveyed to the extruding means.

8. An extruding apparatus for extruding at least two materials onto an article, one of the materials requiring a higher temperature to plasticize than the other, the apparatus comprising:
   a stationary casing having upstream and downstream ends and a cylindrical bore extending therethrough,
   an upstream-located worm and a downstream-located worm in tandem, the worms mounted for rotation together about a common axis in the bore of said casing and including respective upstream and downstream ends, said worms being constructed with respective sections for feeding, compressing and plasticizing extrudable material upon rotation thereof,
   plural means communicating with the bore adjacent the upstream ends of both of said worms for supplying a material to the feeding section of each worm, the feeding section of the upstream-located worm being supplied the one material requiring the higher plasticizing temperature,
   means coupled to said casing for producing temperatures in said respective sections that render plastic the material received by each worm,
   means for rotating said worms,
   means located in the bore for blocking the flow of the one material to the downstream-located worm, the downstream end of said upstream-located worm upstream of said means including a peripheral groove for receiving the one material that is plasticized by said upstream-located worm,
   at least one extruding head mounted adjacent the downstream end of the casing for directly receiving the other material requiring a lower temperature to plasticize, a tube connecting said extruding head with the groove in said upstream-located worm and conveying said one material received by the groove through a path external of said casing, means for reducing the temperature of the material in said tube so that the two materials supplied to said extruder head are approximately the same temperature, and means for providing substantial thermal isolation between said respective sections of each worm and for controlling the temperature of the supply means that is positioned to feed material to said downstream-located worm.

References Cited by the Examiner

UNITED STATES PATENTS

| Re. 23,240 | 6/1950 | Magerkuth et al. | 18—12 |
| 2,574,907 | 11/1951 | Bucken | 18—12 |
| 2,836,851 | 6/1958 | Holt | 18—12 |
| 2,871,516 | 2/1959 | Sherman et al. | 18—12 |
| 3,121,255 | 2/1964 | Henning et al. | 18—13 |
| 3,137,035 | 6/1964 | Hendry. | |

FOREIGN PATENTS 1,282,578   12/1961   France.

References Cited by the Applicant

UNITED STATES PATENTS 2,879,544   3/1959   Fleck.

FOREIGN PATENTS 293,929   7/1928   Great Britain.

WILLIAM J. STEPHENSON, *Primary Examiner.*

J. SPENCER OVERHOLSER, *Examiner.*

L. S. SQUIRES, *Assistant Examiner.*